(12) United States Patent
Berge et al.

(10) Patent No.: US 6,646,055 B2
(45) Date of Patent: Nov. 11, 2003

(54) MICROGELS AND PROCESS FOR THEIR PREPARATION

(75) Inventors: Charles T. Berge, Wilmington, DE (US); Michael Fryd, Philadelphia, PA (US); Jeffrey W. Johnson, Rochester Hills, MI (US); Graeme Moad, Sassafras (AU); Ezio Rizzardo, Wheelers Hill (AU); Christopher Scopazzi, Wilmington, DE (US); San Hoa Thang, Clayton (AU)

(73) Assignees: E. I. du Pont de Nemours and Company, Wilmington, DE (US); Commonwealth Scientific and Industrial Research Organization, Victoria (AU); University of Melburne, Victoria (AU)

( * ) Notice: Subject to any disclaimer, the term of this patent is extended or adjusted under 35 U.S.C. 154(b) by 0 days.

(21) Appl. No.: 09/969,706

(22) Filed: Oct. 3, 2001

(65) Prior Publication Data

US 2002/0022684 A1 Feb. 21, 2002

Related U.S. Application Data

(62) Division of application No. 09/350,243, filed on Jul. 9, 1999, now Pat. No. 6,355,718.
(60) Provisional application No. 60/092,293, filed on Jul. 10, 1998.

(51) Int. Cl.[7] .................. C08F 2/38; C08F 290/04
(52) U.S. Cl. .................. 525/242; 525/267; 524/461; 526/75; 526/222
(58) Field of Search .................. 525/260, 261, 525/267, 242; 526/75, 222, 224; 524/461

(56) References Cited

U.S. PATENT DOCUMENTS

| | | | |
|---|---|---|---|
| 3,928,255 A | 12/1975 | Milkovich et al. | 260/2.5 R |
| 3,975,339 A | 8/1976 | Burchard et al. | 526/347 |
| 4,085,168 A | 4/1978 | Milkovich et al. | 260/886 |
| 4,581,429 A | 4/1986 | Solomon et al. | 526/220 |
| 4,810,756 A | 3/1989 | Spinelli | 525/293 |
| 4,845,156 A * | 7/1989 | Cohen | 525/259 |
| 4,880,859 A | 11/1989 | Slongo et al. | 524/91 |
| 4,956,433 A | 9/1990 | Mezger | |
| 5,169,914 A | 12/1992 | Kaszas et al. | 526/135 |
| 5,310,807 A * | 5/1994 | Antonelli et al. | 525/286 |
| 5,312,871 A | 5/1994 | Mardare et al. | 525/272 |
| 5,322,912 A | 6/1994 | Georges et al. | 526/204 |
| 5,344,737 A | 9/1994 | Berkes et al. | 430/110 |
| 5,362,813 A * | 11/1994 | Antonelli et al. | 525/286 |
| 5,395,885 A | 3/1995 | Kennedy et al. | 525/98 |
| 5,409,795 A | 4/1995 | Kato | 430/115 |
| 5,412,047 A | 5/1995 | Georges et al. | 526/204 |
| 5,444,135 A | 8/1995 | Cheradame et al. | 526/219.2 |
| 5,458,796 A | 10/1995 | Storey et al. | 252/58 |
| 5,498,679 A | 3/1996 | Moffat et al. | 526/204 |
| 5,502,114 A | 3/1996 | Murakami et al. | 525/301 |
| 5,530,079 A | 6/1996 | Veregin et al. | 526/219.3 |
| 5,608,023 A | 3/1997 | Odell et al. | 526/225 |
| 5,627,248 A | 5/1997 | Koster et al. | 526/217 |
| 5,670,564 A * | 9/1997 | Gagne et al. | 524/99 |
| 5,723,511 A | 3/1998 | Kazmaier et al. | 522/35 |
| 5,728,747 A | 3/1998 | Kazmaier et al. | 522/11 |
| 5,789,487 A * | 8/1998 | Matyjaszewski et al. | 525/301 |
| 6,143,848 A * | 11/2000 | Lee et al. | 526/212 |

FOREIGN PATENT DOCUMENTS

| | | |
|---|---|---|
| EP | 0237792 A | 9/1987 |
| EP | 0 735 051 A1 | 10/1996 |
| EP | 0 735 064 A1 | 10/1996 |
| EP | 0 826 697 A2 | 3/1998 |
| WO | WO 98/31739 | 7/1998 |

OTHER PUBLICATIONS

Oguz Okay and Werner Funke: "Anionic Dispersion Polymerisation of 1,4–Divinylbenzene" Macromolecules, vol. 23, 1990, pp. 2623–2628, XP002119668.

Okay et al., Anionic Dispersion Polymerization of 1,4–Divinylbenzene, *Macromolecules*, 23, 2623–2628, 1990.

* cited by examiner

Primary Examiner—Kelechi C. Egwim
(74) Attorney, Agent, or Firm—Sudhir G. Deshmukh

(57) ABSTRACT

A process for preparing microgel(s) that uses a wide range of activatable prepolymers. In the process, a polymer composition of crosslinked component A and soluble components B and C is formed from mono-olefinic and multi-olefinic monomers in the presence of catalyst and initiator. The process comprises:

I) introducing mono-olefinic monomer, catalyst, and initiator into a reactor in the absence of multi-olefinic monomer and producing an activatable prepolymer, component B;

II) contacting the product of I) with multi-olefinic monomer to produce components A and C, optionally in the presence of additional initiator; also optionally in the presence of additional mono-olefinic monomer and initiator. The ratio of components A/(B+C) can be controlled by varying the mole ratio of The Component B/multi-olefinic monomer from 0.05/1 up to 5/1, by decreasing the mole ratio to increase the ratio of A/(B+C), and increasing the mole ratio to decrease the ratio of A/(B+C).

12 Claims, No Drawings

MICROGELS AND PROCESS FOR THEIR PREPARATION

CROSS REFERENCE TO RELATED APPLICATION

This application is a divisional of application Ser. No. 09/350,243, filed Jul. 9, 1999, now U.S. Pat. No. 6,355,718, which is a non-provisional of a provisional Application Serial No. 60/092,293, filed Jul. 10, 1998.

BACKGROUND OF THE INVENTION

The present invention relates to a process for the preparation of a microgel. The term microgel includes microgels and star polymers.

Microgels are macromolecules which possess a very high molecular weight and yet a low viscosity similar to linear or branched polymers of relatively low molecular weight. Microgels are an intermediate structure between conventional linear or branched polymers such as polyethylene or polycarbonate and networks such as vulcanized natural rubber. The dimensions of microgels are comparable with high molecular weight linear polymers but their internal structure resembles a network.

The properties of microgels make them particularly useful in a wide range of applications such as in additives, in advanced material formulations for foams or fibers, in coating compositions, binders and redispersible latexes. Microgels can also be used to improve the ease of processing and to improve the structural strength and dimensional stability of the final products. A further potential use for microgels is as additives for high impact polymers. Microgels embedded in a matrix of conventional linear polymer can act to stabilize the whole structure by distributing mechanical tension. Microgels are also useful in biological systems and as pharmaceutical carriers.

Care is required in preparing microgels as the multiple double bonds present within these systems can readily undergo intermolecular reactions which can lead to intractable networks. PCT/AU98/00015 discloses a process for microgel preparation involving reacting an alkoxyamine with a crosslinking agent. Procedures such as those described by Okay and Funke in Macromolecules, 1990, 23, 2623–2628, require high purity solvent and reagents as well as an inert atmosphere and are complicated by undesirable side reactions. Despite the unique properties of microgels, the difficulties in preparing them have limited their potential and commercial use.

SUMMARY OF THE INVENTION

This invention concerns a new process for preparing microgel(s) employing a wide range of activatable prepolymers. The process of this invention produces a polymer composition of crosslinked component A and soluble components B and C from mono-olefinic and multi-olefinic monomers in the presence of catalyst and initiator. The process comprises:

I) introducing mono-olefinic monomer, catalyst, and initiator into a reactor in the absence of multi-olefinic monomer and producing an activatable prepolymer component B;

II) contacting the product of I) with multi-olefinic monomer to produce components A and C, optionally in the presence of additional initiator, also optionally in the presence of additional mono-olefinic monomer and initiator. The ratio of components A/(B+C) can be controlled by varying the mole ratio of (Component B)/(multi-olefinic monomer) from 0.05/1 up to 5/1, by decreasing said mole ratio to increase the ratio of A/(B+C), and increasing said mole ratio to decrease the ratio of A/(B+C).

Component B is the soluble species made in step I, A is the insoluble species made in Step II and C is the soluble species made in Step II.

The prepolymer, B, will be comprised of an activatable prepolymer. As will be understood by one skilled in the art having this disclosure as guidance, the activatable prepolymer is a polymer that under the conditions of the experiment can reversibly generate propagating radicals. The activatable prepolymer contains a group which is adapted to reversibly cleave from the prepolymer B under activating conditions to provide a reactive propagating radical and so promote living/controlled polymerization.

The term activatable prepolymer includes a polymer containing activated halogen (or pseudohalogen) groups, a polymer terminated with thiocarbonylthio groups (including dithiocarbamate, dithiocarbonate, trithiocarbonate, dithioester groups), a macromonomer (a polymer chain having at least one polymerizably-active functionality per polymer chain).

Methods for Preparing Component B(Step I)

Polymers containing halogen (or pseudohalogen) groups are activatable prepolymers in atom transfer radical polymerization (ATRP). Typical examples of transition metal catalysts for atom transfer radical polymerization include complexes such as CuX/2,2'-bipyridyl derivatives, CuX/Schiff base complexes, CuX/N-alkyl-2-pyridylmethanimine, CuX/tris[2-(dimethylamino)ethyl]amine, CuX/N,N,N',N'',N''-pentamethyldiethylenetriamine, CuX/tris[(2-pyridyl) methyl]amine, $Mn(CO)_6$, $RuX_x(PPh_3)_3$, $NiX\{(O—O'—CH_2NMe_2)_2C_6H_3\}$, $RhX(PPh_3)_3$, $NiX_2(PPh_3)_2$ and $FeX_2/P(n-Bu)_3$ wherein X is halogen or pseudohalogen and preferably chlorine or bromine. An alumoxane $Al(OR)_3$ may be used as a cocatalyst. It is believed that the mechanism of ATRP is described in the following scheme:

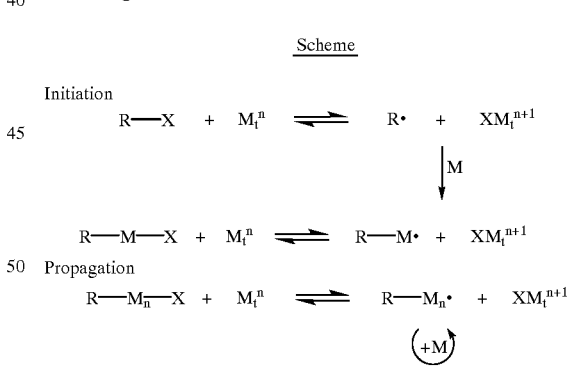

Initially, the transition metal catalyst, $M_t^n$, abstracts the halogen atom X from the initiator, an arene or alkane sulfonyl halide, R—X, to form the oxidized species, $M_t^{n+1}$X, and the sulfur centered radical R•. In the subsequent step, the radical, R•, reacts with unsaturated monomer, M, with the formation of the intermediate radical species, R—M•. The reaction between $M_t^{n+1}$X and R—M• results in the product, R—M—X, and regenerates the reduced transition metal species, $M_t^n$, which further reacts with R—X and promotes a new redox cycle. When polymeric halides, R—$M_n$—X, are reactive enough toward $M_t^n$ and monomer is in excess, a number of atom transfer radical events, i.e., a living/controlled radical polymerization occurs. Further, details of this mechanism are described in the reference: Macromolecules, 1995, 28, 7901. See also Macromolecules, 1995, 28, 7970 and Macromolecules, 1996, 29, 3665 concerning living/controlled radical polymerization using a combination of an arenesulfonyl chloride or alkane sulfonyl chloride and a transition metal compound.

One part of the polymerization system in the process is an arenesulfonyl halide or an alkanesulfonyl halide of the Formula $A^1SO_2X$ wherein $A^1$ is an aryl, substituted aryl group, an alkyl group or a substituted alkyl group, and X is chlorine, bromine or iodine. Included within the meaning of arenesulfonyl halide and alkanesulfonyl halide is any adduct, such as a 1:1 adduct, which is a reaction product of an arene- or alkyl-sulfonyl halide and any polymerizable vinyl monomer. In effect, such an adduct is one of the initial products in the polymerization process itself.

Another component of the polymerization process system is a compound containing a lower valent transition metal atom. By this is meant a compound containing at least one transition metal atom that is capable of existing in a higher valent state. Included within the definition of a compound containing a transition metal atom in a lower valent state is a compound or combination of compounds that under the polymerization process conditions can form in situ the desired compound containing a transition metal atom in a lower valent state. In some cases, this can include metal itself (or an alloy or a metal oxide thereof) which can dissolve and/or be solubilized to some extent in the process medium.

Suitable lower valent metals include Cu[I], Ru[I], Ni[II], Re[II], Pd[II], Cu[0], Ni[0], Fe[0], Pd[0], and Rh[II]. The transition metal compound should preferably be at least slightly soluble in the polymerization medium. Optionally, the transition metal compound which is added can be solublized by the addition of a complexing agent such as a 2,2'-bipyridine derivative, for example, 4,4'-di(5-nonyl)-2,2'-bipyridine. The complexing agent should also be chosen such that the transition metal has the appropriate redox potential. Other suitable complexes are listed above. The molar ratio of lower valent transition metal compound: arenesulfonyl halide or alkanesulfonyl halide is not critical, but it is preferred that it be greater than 0.2, more preferably greater than 0.5, especially if a living polymerization is desired. It is also preferred that this ratio not be over 5, and more preferably be less than 2.

Thiocarbonylthio and related transfer agents and reaction conditions for the use of these compounds in producing activatable prepolymers are disclosed in Int. Patent Applications WO 98/01478, WO 99/05099 and WO 99/31144 which are incorporated herein by reference.

Preferred thiocarbonylthio chain transfer agents used to form the activatable prepolymer are represented by Formulas III a–c.

IIIa

IIIb

IIIc

In Formula IIIa:
  Z is selected from the group consisting of hydrogen, chlorine, optionally substituted alkyl, optionally substituted aryl, optionally substituted heterocyclic ring, optionally substituted alkylthio, optionally substituted arylthio, optionally substituted alkoxy, optionally substituted aryloxy, optionally substituted amino, optionally substituted alkoxycarbonyl, optionally substituted aryloxycarbonyl, carboxy, optionally substituted acyloxy, optionally substituted aroyloxy, optionally substituted carbamoyl, cyano, dialkyl- or diaryl-phosphonato, dialkyl-phosphinato or diaryl-phosphinato and a polymer chain.
  $R^7$ is selected from the group consisting of optionally substituted alkyl, optionally substituted alkenyl, optionally substituted alkynyl, optionally substituted (saturated, unsaturated or aromatic) carbocyclic ring, optionally substituted (saturated, unsaturated or aromatic) heterocyclic ring, optionally substituted alkylthio group, and a polymer chain. $R^7$ is chosen such that it forms a free radical leaving group that can initiate free radical polymerization under the reaction conditions.

In Formula IIIb:
  n is an integer greater than 1; $R^{7'}$ is an n-valent moiety derived from $R^7$ as defined in Formula IIIa and Z is as defined for Formula IIIa.

In Formula IIIc:
  n is an integer greater than 1; $R^7$ is as defined in Formula IIIa; and Z' is an n valent moiety derived from a species selected from the group consisting of optionally substituted alkyl, optionally substituted aryl and a polymer chain where the connecting moieties are selected from the group consisting of aliphatic carbon, aromatic carbon, oxygen and sulfur.

The substituents for the substituted moieties referred to above for $R^7$, $R^{7'}$, Z and Z' are selected from the group consisting of hydroxy, tertiary amino, halogen, cyano, epoxy, carboxylic acid, alkoxy, alkyl having 1–32 carbon atoms, aryl, alkenyl having 2–32 carbon atoms, alkynyl having from 2–32 carbon atoms, saturated carbocyclic rings having 3–14 carbon atoms, unsaturated carbocyclic rings having 4–14 carbon atoms, aromatic carbocyclic rings having 6–14 carbon atoms, saturated heterocyclic rings having 3–14 carbon atoms, unsaturated heterocyclic rings having 4–14 carbon atoms aromatic carbocyclic rings having 4–14 carbon atoms.

By a "polymer chain" referred to above for $R^7$, $R^{7'}$, Z and Z' is meant conventional condensation polymers, such as polyesters [for example, polycaprolactone, poly(ethylene terephthalate), poly(lactic acid)], polycarbonates, poly(alkylene oxide)s [for example, poly(ethylene oxide), poly(tetramethylene oxide)], nylons, polyurethanes, or chain polymers such as those formed by coordination polymerization (for example polyethylene, polypropylene), radical polymerization (for example, poly(meth)acrylates and polystyrenics), anionic polymerization (for example, polystyrene, polybutadiene), cationic polymerization (for example, polyisobutylene) and group transfer polymerization (for example, poly(meth)acrylates).

Other multifunctional thiocarbonylthio compounds also can be used.

Another class of polymer component B comprises macromonomers depicted by Formula IV and include those disclosed in Int Pat Appl. WO96/15157 and U.S. Pat. No. 5,264,530. Reaction conditions for the use of these compounds in producing activatable prepolymers are also disclosed. Preferably macromonomers contain a maximum of 2 double bonds, more preferably macromonomers contain 1 double bond per polymer chain:

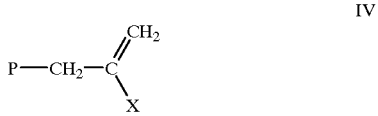

IV

Macromonomers of this type can be prepared by a number of different methods. Two illustrative methods of preparation are (1) use of catalytic chain transfer agents containing $Co^{(II)}$ or $Co^{(III)}$; and (2) addition-fragmentation polymerization. These methods are discussed by Rizzardo et al. in Macromol. Symp. 1997, 111, 1.

X is selected from the group consisting of halogen, optionally substituted aryl, alkoxycarbonyl, optionally substituted aryloxycarbonyl, carboxy, optionally substituted acyloxy, aroyloxy, optionally substituted carbamoyl, and cyano.

P is a oligomer or polymer chain as defined above. P is chosen such that it forms a free radical leaving group that can initiate free radical polymerization under the reaction conditions.

The prepolymer component B comprises one or more monomer units; however, it is particularly preferred that the prepolymer is an oligomer comprising at least 3 monomer units and more preferably at least 5 monomer units. The molecular weight (weight average) of the prepolymer components is preferably at least 1000 and more preferably from about 3,000 to 25,000.

Step II: Preparation of Microgel

When the prepolymer includes at least three monomer units (preferably at least 5), the resulting microgel takes the form of linear arms of prepolymer linked to a crosslinked network forming a core. This type of microgel can conveniently be referred to as a star microgel.

The proportion of components used in the process of the invention will generally depend on the desired properties of the microgel and the intended application. Generally, the microgel is prepared using up to 60 mole percent of crosslinking agent based on moles of polymerizable components. More preferably, the crosslinking agent will comprise up to 50 mole percent of the total of the polymerizable components. Typically, the prepolymer component B will compose from about 0.1 to 95 mole percent of the polymerizable components.

The present invention allows a higher proportion of crosslinking agent than has previously been possible for microgel compositions. Prior art microgels have generally been restricted to using no more than several mole percent of crosslinking agent. The ability to use high concentrations of crosslinking agent enables microgels to be prepared with a high density conferring significant advantages in rheology control. Accordingly, it is preferred that the process of the invention uses at least 0.5 mole percent of crosslinking agent based on total of the polymerizable components and most preferably from 0.5 to 50%.

In the process of the present invention, when the average number of monomeric units in the prepolymer portion of the adduct is less than 5 monomeric units it is particularly preferred that the monomer composition include additional monomer(s) selected from monounsaturated monomers and conjugated diene monomers. As the average number of monomer units in the prepolymer portion of the adduct decreases, the improvement provided by using monomer becomes more significant. When the number of monomeric units in the prepolymer is from 1 to 3, a monounsaturated monomer is typically used.

Typically, the unsaturated monomer is present in up to 80 mole percent based on the total number of moles of the polymerizable components and more preferably from 10 to 80%.

When the number of monomer units present in the prepolymer is less than 5, the adduct is preferably present in an amount of from 5 to 60 mole percent.

Star microgels are preferably prepared using from 50 to 95 mole percent of adduct and up to 45 mole percent of monounsaturated monomer.

The additional monomer(s) used in the process of the invention can be any monounsaturated monomer such as an alkene, acrylate, methacrylate, styrene, an alkylstyrene (for example, vinyltoluene), other styrenic monomers, acrylonitrile, methacrylonitrile, vinyl acetate, vinyl chloride or vinylidene chloride, or a conjugated diene monomer such as butadiene, isoprene, chloroprene, or cyclopentadiene.

The properties of the microgel and its reactivity in subsequent applications is controlled by the choice of monomers and their functional groups. Examples of monomers include $C_2$ to $C_{10}$ alkenes, alkyl acrylates, alkyl methacrylates, hydroxyalkyl acrylates, hydroxyalkyl methacrylates, haloalkyl acrylates, haloalkyl methacrylates, alkoxyalkyl acrylates, alkoxyalkyl methacrylates, N-substituted or N,N-disubstituted aminoalkyl methacrylates, cycloalkyl acrylates, cycloalkyl methacrylates, phenyl acrylate, phenyl methacrylate, alkylene glycol acrylate, alkylene glycol methacrylate, poly(alkylene glycol) acrylate, poly(alkyleneglycol) methacrylate, acrylamides, methacrylamides, derivatives of acrylamindes and methacrylamides, esters of fumaric acid, maleic acid, maleic acid anhydride, N-vinylcarbazole, N-vinylpyrrolidone, vinylpyridine, benzyl acrylate and benzyl methacrylate.

When the prepolymer is an oligomer, the oligomer can be a homopolymer or a copolymer. When the oligomer is a copolymer, it can be a statistical, an alternating, a gradient, or a block copolymer. The monomers used in preparing the oligomer can include one or more functional groups in addition to the double bond. These additional functional groups are selected to confer the desired polarity or reactivity on the arms of the star type microgel. Examples of additional functional groups include halo, amino, hydroxy, carboxyl, mercapto, substituted amino, silane groups and epoxy. Hydroxyfunctional groups such as in the monomer hydroxyethyl methacrylate are particularly preferred. A monomer which includes the additional functional group or groups can be incorporated as a homopolymer chain or as part of a statistical or block copolymer.

Statistical or gradient copolymers can be prepared by using a mixture of monomers. Block copolymers can be prepared by introducing monomers sequentially to provide a block of the first monomer before the second is introduced.

The multiolefinic compound used in the process of the invention preferably contains two or more carbon-carbon double bonds. Other functional groups such as hydroxyl, carboxyl, ester, amide, amino, substituted amino, mercapto, silane and epoxy or the like can be present if desired.

Examples of suitable multi-olefinic compounds include divinylbenzene and derivatives of divinylbenzene and monomers containing two or more acrylate or methacrylate functional groups. Examples of such polyacrylate compounds include polyols substituted with two or more double bonds derived from acrylic or methacrylic acids.

Examples of di- and tri-acrylate compounds include compounds of Formula XI:

$$R^8-\underset{CH_2}{C}-\overset{O}{\underset{}{C}}-Y^1-Q-Y^2-\overset{O}{\underset{}{C}}-\underset{CH_2}{C}-R^9 \qquad XI$$

wherein $R^8$ and $R^9$ are independently selected from hydrogen, halogen, $C_1$ to $C_6$ alkyl, preferably methyl, and substituted $C_1$ to $C_6$ alkyl such as $C_1$ to $C_6$ hydroxyalkyl;

- $Y^1$ and $Y^2$ are independently selected from $NR^{10}$ and O where $R^{10}$ is independently selected from hydrogen and alkyl (preferably methyl) substituted $C_1$ to $C_6$ alkyl (such as $C_1$ to $C_6$ hydroxyalkyl) aryl, and substituted aryl; and
- Q is any linking group known in the art. Preferred linking groups include alkylene (preferably of 1 to 12 carbon atoms), a carbocyclic or heterocyclic group, a polyalkylene oxide, polyester or polyurethane chain and wherein the groups can optionally be substituted with one or more substituents selected from halo, hydroxy, tertiary amino, substituted amino, silane, epoxy. Q can also contain acrylate or methacrylate group.

Preferably, Q is alkylene of 1 to 10 carbon atoms or a poly(alkylene oxide) and optionally include a substituent selected from hydroxy, amino, silane, epoxy and acrylate or methacrylate. When one or both of $R^8$ and $R^9$ are substituted alkyl, suitable substituents include hydroxy, halo, amino, substituted amino, thiol, silane and epoxy.

Preferred polyacrylate compounds include trimethylolpropane triacrylate, trimethylol propane trimethacrylate, pentaerythritol tetraacrylate, pentaerythritol tetramethacrylate, pentaerythritol triacrylate, pentaerythritol trimethacrylate, alkylene glycol diacrylates, alkylene glycol dimethacrylates, poly(alkylene glycol) dimethacrylates, poly(alkylene glycol) diacrylates, poly(oxyalkylene glycol) dimethacrylates, poly(oxyalkylene glycol) diacrylates, 2-cyanoethyl acrylate, alkylene glycol acrylate or methacrylate, poly(alkylene glycol) acrylate or methacrylate. Specific example of multi-olefinic compounds include divinylbenzene, ethylene glycol dimethacrylate, butanediol dimethacrylate, triethylene glycol diacrylate, 1,6-hexanediol diacrylate, trimethylolpropane triacrylate, triethylene glycol diacrylate, pentaerythritol triacrylate, 1,3-butylene glycol diacrylate and ethylene glycol acrylate methacrylate and other polyol acrylates or methacrylates.

Allyl and substituted allyl derivatives, such as esters of acrylic and methacrylic acid, ethers and amines can also be used as multi-olefinic compounds.

Some examples are listed below:

Where $R_1$ = H or alkyl
$R_2$ = H or alkyl
$R_1$ and $R_2$ may contain functional groups, ie. hydroxy.

where $R_3$ = H or methyl

Allyl Acrylates:

where $R_1 = R_2 = H$ $R_1 = H, R_2 = CH_3$ $R_1 = R_2 = CH_3$

Allyl Methacrylates:

where $R_1 = R_2 = H$ $R_1 = H, R_2 = CH_3$ $R_1 = R_2 = CH_3$

Diallyl Ethers:

Where $R_1$ = H or alkyl
$R_2$ = H or alkyl
$R_1$ and $R_2$ may contain functional groups, ie. hydroxy.

$R_1$ and $R_2$ can also form unsymmetrical structures

Examples:

Diallyl Amines:

Where $R_1$ = H or alkyl,
$R_2$ = H or alkyl,
$R_1$ and $R_2$ may contain functional groups, i.e., hydroxy,
$R_1$ and $R_2$ can also form unsymmetrical structures.

Examples:

Triallyl Amines:

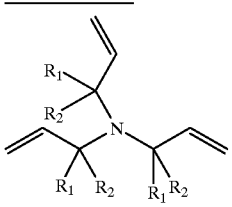

-continued

Where R₁ = H or alkyl
R₂ = H or alkyl
R₁ and R₂ may contain functional groups, ie. hydroxy.

R₁ and R₂ can also form unsymmetrical structures

Examples

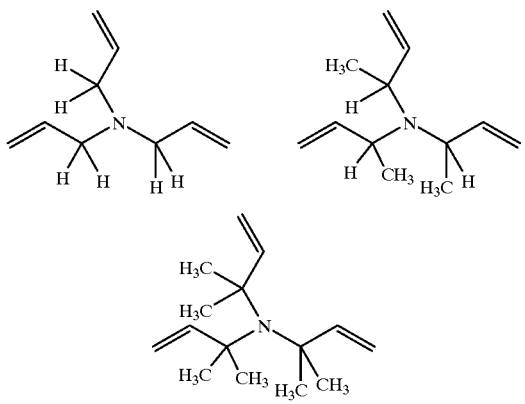

Other unsubstituted compounds:

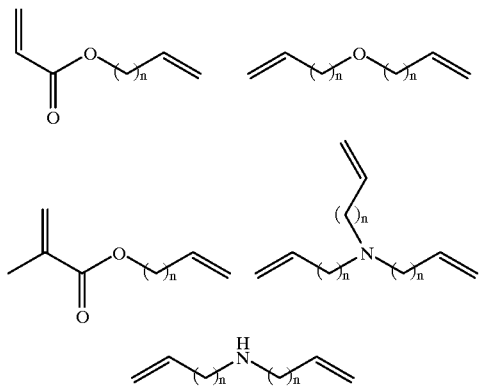

where n=0–4

The crosslinking agent can be used to control the architecture and chemical properties of the crosslinked network which constitutes the core of the star microgel. Three general types of multi-olefinic compounds can be used depending on the properties required.

When the unsaturated groups in the crosslinking monomer are equivalent, their relative reactivity is determined by statistical considerations. A greater degree of control is provided when the unsaturated groups have different reactivities. Without wishing to be bound by theory, we believe the greater control provided by using unsaturated group(s) of different reactivities occurs due to the occurrence of chain growth at one of the double bonds prior to completion of crosslinking. The other type of crosslinking agent which can be used includes additional functional groups selected to provide the desired interaction with solvents or other species or the reactivity of the microgen. These three groups of crosslinkers will be discussed in more detail.

Examples of multi-olefinic compounds in which the vinyl groups are of equivalent reactivity include divinyl benzene and compounds of Formula XI wherein $R^8$ and $R^9$ are similar, $Y^1$ and $Y^2$ are similar, and Q is unsubstituted or has symmetrical substitution. Commercially available monomers of this type include alkylene glycol diacrylates and dimethacrylates such as 1,4-butanediol diacrylate or 1,4-butanediol dimethacrylate.

Examples of multi-olefinic compounds in which the vinyl groups have different reactivities include compounds wherein $R^8$ and $R^9$ are different and/or $Y^1$ and $Y^2$ are different. Such multi-olefinic compounds contain two different unsaturated groups selected from acrylate, methacrylate, acrylamide and methacrylamide. The two different saturated groups can be linked for example by alkylene glycol or polyalkylene glycol linking groups.

Particularly preferred multi-olefinic compound with distinct vinyl groups include the following:

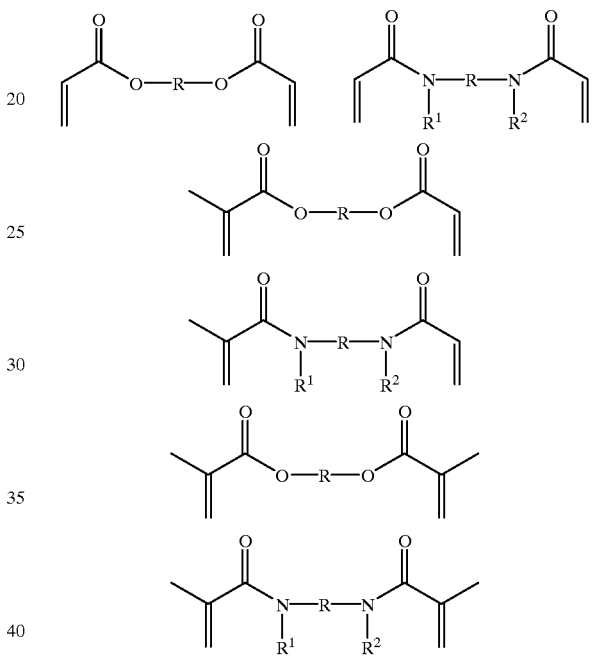

$R = (CH_2)_n$ or $(CH_2-CH_2-O-)_nCH_2-CH_2-$
$R^1$, $R^2$ independently selected from H and alkyl Another group of multi-olefinic compounds which are useful in the invention are compounds which in addition to at least two unsaturated groups further include one or more other functional groups such as hydroxyl, mercapto, amine, halo, amido and alkoxycarbonyl. Substituted compounds of this general type are particularly useful in producing star microgels having a hydrophilic core or a core including reactive groups. Specific examples of such multi-olefinic compounds include hydroxy-substituted compounds such as pentaerythritol triacrylate and compounds of Formula XI wherein Q includes one or more substituents selected from hydroxyl, amino, substituted amino, silane, and epoxy or a group of structure XII.

The process of this invention can use a mixture of multi-olefinic compounds. For example, the use of multi-olefinic compounds from different classes such as divinyl benzene and diacrylates or dimethacrylates can provide advantages. Further, combinations of symmetrical multi-olefinic compounds and multi-olefinic compounds having double bonds of different reactivities can be used to control crosslinking density.

The process of the invention can be conducted in the presence of a solvent, if desired, and can be conducted in solution, in bulk or in suspension.

In preparation of star microgels, the reaction is preferably conducted in a suitable solvent for the oligomer and theta-solvents are particularly preferred. In some cases, the crosslinking reaction is highly efficient when a mixture of crosslinking agent and a monomer containing one unsaturated group is employed and it is believed the monomer acts as a spacing unit. It is also preferred that the spacing monomer solvate the arms of the star-type microgel which are derived from the oligomer.

Without wishing to be bound by theory, we believe the monomer diluent acts as a spacer monomer to control crosslinking density and to improve the efficiency of crosslinking. In some systems, it can be difficult to obtain efficient crosslinking and microgel formation in the absence of a suitable monomer such as monounsaturated monomer.

The spacer monomer can comprise a monomer having one or more additional functional groups to provide a means for controlling the reactivity or chemical properties of the microgel. For example, in one embodiment, the spacer monomer comprises at least two types of monomers including a monomer which provides a relatively inert monomer unit and a functionalized monomer incorporating one or more additional functional groups such as hydroxyl, carboxyl, amides, amino substituted amino, thiol, silane, epoxy or the like.

The spacer monomer can be the same or different from the monomer used in preparing the oligomer. However, in many cases it is convenient to use the same monomer. The spacer monomer is typically in the range of from 0 to 99 mole percent of the polymerizable components.

The process of the present invention generally has the significant advantage over prior art processes in that it allows oligomer arms to be incorporated much more efficiently so that the proportion of unreacted residual monomer in the resulting microgel is reduced.

The microgel prepared in accordance with the process of the invention generally has a weight average molecular weight of at least about $10^4$. Preferably, the molecular weight is in the range of about $10^4$ to $10^8$ and most preferably about $10^5$ to $10^8$. The molecular weight is determined by light scattering.

The microgels prepared according to the process of the invention have a range of applications as rheology control agents in solvent-borne and waterborne coatings and in adhesives and cosmetics.

In formulating a coating composition, it is desirable to provide maximum solids content and good durability. Whereas high solids content is best satisfied by using a low molecular weight polymer, durability is best satisfied by high molecular weight. The microgels of the present invention provide a polymer of high molecular weight, and hence good durability, while at the same time providing the solubility and flow properties to enable a high solids content to be achieved. The microgels also allow a reduction in solvent content to be achieved without the problems of sagging which occur with lower molecular weight resins.

The microgels of the invention can be used in thermosetting or radiation-curable compositions. Such compositions will generally comprise a microgel which comprises pendant functional groups which can be provided by using a monomer or a crosslinking agent which has the appropriate functional group such as a hydroxy, amino, carboxyl, mercapto, substituted amino, silane, carbamate or epoxy group. The crosslinking agent will contain functional groups which are reactive with the pendant functional group of the microgen under the curing conditions.

The microgels are also useful as plastic additives to improve impact resistance and internal lubrication and as a pharmaceutical carrier, particularly when prepared using polar functional groups, which can facilitate association of the microgel with the pharmaceutical.

EXAMPLE 1

A. Arm Formation via Dithioester Route

Isobutyl methacrylate (500 g, 2.52 moles), 2-ethylhexyl methacrylate (400 g, 2.82 moles), hydroxyethyl methacrylate (100 g, 0.77 mole), 2-phenylprop-2-yl dithiobenzoate (27.7 g, 0.10 mole), and toluene (450 g) were added to a three-necked 2 liter round bottom flask equipped with a mechanical stirrer, condenser, heating mantle, and nitrogen purge line. The solution was degassed with nitrogen for 20 minutes and then heated to 110–115 C. When the reaction mixture had stabilized at 110–115 C., Vazo®88 (7.5 g, 31 mole) was added as a shot. The resulting mixture was held at 110–115 C. for 6 hours.

B. NAD Formation Using Dithioester Arm

Dithioester arm (542 g) prepared above was added to a 3 liter round bottom flask equipped as above along with: hydroxyethyl acrylate (56 g), methyl methacrylate (258 g), methyl acrylate (177 g), styrene (96 g), allyl methacrylate (32 g), heptane (483 g) and mineral spirits (128 g). This mixture was degassed with nitrogen for 15 minutes and then heated to reflux. A mixture of Vazo®67 (11 g), mineral spirits (87 g), and butanol (41 g) was prepared and added to the reaction vessel over a 210 minute period. After completion of this add, the reaction mixture was held at reflux for 45 minutes. After the hold period, a mixture of Vazo®67 (6 g), and butanol (42 g) was added to the reaction vessel over 90 minutes. After completion of this add, the reaction mixture was held at reflux for 60 minutes and then 185 g of solvent were removed by distillation at atmospheric pressure.

EXAMPLE 2

A. Preparation of Hydroxy Functional Macromonomer

To a 5-liter round bottom flask equipped with a mechanical stirrer, thermometer, condenser, and heating mantle was added 545 gms of isobutylmethacrylate(IBMA), 583.7 gms of 2-ethylhexyl methacrylate(EHMA), 95.6 gms of hydroxyethyl methacrylate(HEMA) and 939.4 gms of toluene. This mixture was agitated and heated to reflux under nitrogen. While maintaining the batch at reflux, a mixture of 1.1 gms Vazo®88(1,1-azobis(cyanocyclohexane)), 31.7 gms of HEMA, 60.1 gms of toluene, and 32 mg of diaquobis (boron difluorodimethylglyoximato) cobaltate was added over a 10 minute period. This was followed by the addition of a mixture of 388.6 gms IBMA, 561.4 gms EHMA, 103.6 gms HEMA, 179.9 gms toluene and 4.0 gms Vazo®88 to the batch over 240 minutes while maintaining reflux. The batch was then held at reflux for 30 minutes followed by the addition of a solution of 1.0 gm Vazo®88 in 135.7 gms toluene over 60 minutes maintaining reflux. The batch was held at reflux for 60 minutes and then colled to room temperature.

NAD Preparation With The Hydroxy Macromonomer

To a 3-liter round bottom flask equipped with a mechanical stirrer, thermometer, condenser, and heating mantle 753.2 gms of the above prepared macromonomer solution, 189.1 gms mineral spirits, and 934.8 gms heptane were added. The solution was degassed with nitrogen for 15 minutes and then heated to reflux. At reflux 1.8 gms of Vazo®67 was added as a shot followed by the addition of a mixture of 109 gms hydroxyethyl acrylate, 500 gms methyl methacrylate, 342.8 gms methyl acrylate, 185.6 gms styrene, 62 gms allyl methacrylate, 378.2 gms of the above prepared macromonomer, 18.6 gms Vazo®67, 226.1 gms mineral spirits, 32.6 gms heptane, and 32.6 gms butanol over a 210 minute period while maintaining reflux. Following a 45 minute hold period at reflux, a mixture of 12.1 gms Vazo®67, 73.4 gms butanol, and 21.6 gms heptane was added over 90 minutes. The reaction mixture was then held at reflux for an additional 60 minutes and then 355.7 gms of solvent were removed by distillation at atmospheric pressure.

EXAMPLE 3

Polymerization of Styrene via ATRP

Twenty milliliters of styrene(0.175 mole), 180 mg p-methoxybenzenesulfonyl chloride(8.71×10$^{-4}$ mole), 30 mg of CuCl (3.03×10$^{-4}$ mole) and 250 mg 4,4'-di-n-nonyl-2,2'-bipyridine (6.13×10$^{-4}$ mole) were added to a 250 ml Schlenk flask, and the solution was degassed by 4 freeze-pump-thaw cycles, and then the tube was filled with argon and heated at 120 C. for 17 hours. The polymerization was stopped and the viscous solution was analyzed by NMR (conversion to polymer was 67%) and GPC(Mn=15,400, Mw/Mn=1.29, based on a PS standard). Theoretical Mn assuming a living polymerization was 14,000. The polystyrene was isolated by precipitation of a THF solution in methanol, filtration and drying under vacuum.

B. NAD Formation Using Polystyrene Arm

Polystyrene arm (5.42 g) prepared above was added to a 500 milliliter round bottom flask equipped with a mechanical stirrer, condenser, and thermometer along with: hydroxyethyl acrylate (0.56 g), methyl methacrylate (2.58 g), methyl acrylate (1.77 g), styrene (0.96 g), allyl methacrylate (0.32 g), heptane (4.83 g) and mineral spirits (1.28 g). This mixture was degassed with nitrogen for 15 minutes and then heated to reflux. A mixture of Vazo®67 (0.11 g), mineral spirits (0.87 g), and butanol (0.41 g) was prepared and added to the reaction vessel over a 210 minute period. After completion of this addition, the reaction mixture was held at reflux for 45 minutes. After the hold period, a mixture of Vazo®67 (0.06 g), and butanol (0.42 g) was added to the reaction vessel over 90 minutes. After completion of this addition, the reaction mixture was held at reflux for 60 minutes.

We claim:

1. A process for forming a microgel which comprise a core of crosslinked polymer and multiplicity of substantially linear polymeric arms attached to the core;

wherein the process comprises (a) polymerizing monoethylenically unsaturated monomers in the presence of a thiocarbonylthio chain transfer agent to form a prepolymer containing a thiocarbonylthio group that has a weight average molecular weight of 1,000–25,000;

(b) polymerizing said prepolymer with monomers of the core comprising monoethylenically unsaturated monomers and 0.5–60 mole percent, based on the total moles of monomer of the core, of multi-olefinic polymerizable monomers containing two or more carbon-carbon double bonds which are crosslinked in the core to form the microgel having a weight average molecular weight of 10$^4$–10$^8$;

wherein the monoethylenically unsaturated monomers of the core and the prepolymer are individually selected from the group consisting of alkenes having 2–10 carbon atoms, alkyl (meth)acrylates having 1 –12 carbon atoms in the alkyl group, hydroxyalkyl (meth) acrylate, wherein the alkyl groups have 1–4 carbons atoms, styrene, alkylstyrene, acrylonitrile, glycidyl (meth)acrylate, isobornyl (meth)acrylate, alpha-beta ethylenically unsaturated monocarboxylic acids, haloalkyl (meth)acrylates, alkoxyalkyl (meth)acrylates, aminoalkyl (meth)acrylates, N-substituted aminoalkyl (meth)acrylates, N,N-di-substituted aminoalkyl (meth) acrylates, cycloalkyl (meth)acrylates, phenyl (meth) acrylate, alkylene glycol (meth)acrylate, poly(alkylene glycol) (meth)acrylate, acrylamides, methacrylamides, esters of fumaric acid, esters of maleic acid, maleic acid, maleic acid anhydride, N-vinylcarbazole, N-vinylpyrrolidone, vinylpyridine, benzyl (meth) acrylate, vinyl acetate, vinyl chloride, vinylidene chloride, butadiene, isoprene, chloroprene and any mixtures thereof; and wherein the thiocarbonylthio transfer agent is selected from the group consisting of

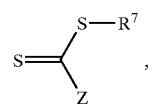

IIIa

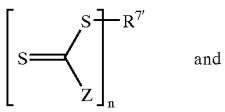 and

IIIb

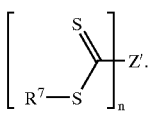

IIIc wherein:

Z is selected from the group consisting of hydrogen, chlorine, alkyl, aryl, heterocyclic ring, alkylthio, arylthio, alkoxy, aryloxy, amino, alkoxycarbonyl, aryloxycarbonyl, carboxy, acyloxy, aroyloxy, carbamoyl, cyano, dialkyl- and diaryl-phosphonato, dialkyl-phosphinato and diaryl-phosphinato and a polymer chain;

R$^7$ is selected from the group consisting of alkyl, alkenyl, alkynyl, saturated, unsaturated and aromatic carbocyclic ring, saturated, unsaturated and aromatic heterocyclic ring, alkylthio group, and a polymer chain, such that R$^7$ forms free radical leaving group that can initiate free radical polymerization under the reaction conditions;

n is an integer greater than 1; R$^{7'}$ is an n-valent moiety derived from R$^7$ and Z' is an n valent moiety derived from a species selected from the group consisting alkyl, aryl and a polymer chain where the connecting moieties are selected from the group consisting of aliphatic carbon, aromatic carbon, oxygen and sulfur.

2. The process of claim 1 in which the multi-olefinic polymerizable mononomers consist of compounds of the formula

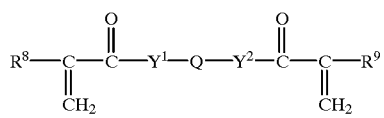

XI wherein R$^8$ and R$^9$ are independently selected from the group consisting of hydrogen, halogen, C$_1$ to C$_6$ alkyl, and substituted C$_1$ to C$_6$ alkyl;

$Y^1$ and $Y^2$ are independently selected from the group consisting of $NR^9$ and O where $R^9$ is independently selected from hydrogen and alkyl; and Q is selected from the group consisting of alkylene having 1 to 12 carbon atoms, a carbocyclic group, a heterocyclic group, polyalkylene oxide, polyester, and polyurethane.

3. The process of claim 2 wherein the groups in Q are substituted with one or more substituents selected from the group consisting of halo, hydroxy, tertiaryamino, substituted amino, silane, epoxy, acrylate and methacrylate.

4. A process for forming a microgel which comprise a core of crosslinked polymer and multiplicity of substantially linear polymeric arms attached to the core;

wherein the process comprises
  (a) polymerizing monoethylencically unsaturated mononmers in the presence of a thiocarbonylthio chain transfer agent to form a prepolymer containing a thiocarbonylthio group that has a weight average molecular weight of 1,000–25,000;
  (b) polymerizing said prepolymer with monnmers of the core comprising monoethylenically unsaturated monomers and 0.5–60 mole percent, based on the total moles of monomer of the core, of multi-olefinic polymerizable monomers containing two or more carbon-carbon double bonds which are crosslinked in the core, to form the microgel having a weight average molecular weight of $10^4$–$10^8$;

wherein the monethylenically unsaturated monomers of the core and the prepolymer are individually selected from the group consisting of alkenes having 2–10 carbon atoms, alkyl (meth)acrylates having 1–12 carbon atoms in the alkyl group, hydroxyakyl (meth)acrylate, wherein the alkyl groups have 1–4 carbons atoms, styrene, alkylstyrene, acrylonitrile,glycidyl (meth)acrylate, isobornyl (meth)acrylate, alpha-beta ethylenically unsaturated monocarboxylic acids, haloalkyl (meth)acrylates, alkoxyalkyl (meth)acrylates, aminoalkyl (meth)acrylates, N-substituted aminoalkyl (meth)acrylates, N,N-di-substituted aminoalkyl (meth) acrylates, cycloalkyl (meth)acrylates, phenyl (meth) acrylate, alkylene glycol (meth)acrylate, poly(alkylene glycol) (meth)acrylate, acrylamides, methacrylamides, esters of fumaric acid, esters of maleic acid, maleic acid, maleic acid anhydride, N-vinylcarbazole, N-vinylpyrrolidone, vinylpyridine, benzyl (meth) acrylate, vinyl acetate, vinyl chloride, vinylindene chloride, butadiene, isoprene, chloroprene and any mixtures thereof; and wherein the thiocarbonylthio transfer agent is selected from the group

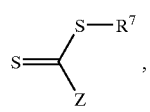
IIIa

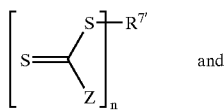 and
IIIb

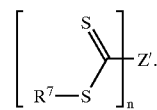
IIIc wherein:
Z is selected from the group consisting of hydrogen, chlorine, alkyl and substituted aryl, aryl and substituted aryl, heterocyclic ring and substituted heterocyclic ring, alkythio and substituted alkylthio, arylthio and substituted arylthio, alkoxy and substituted alkoxy, aryloxy and substituted aryloxy, amino and substituted amino, alkoxycarbonyl and substituted alkoxycarbonyl, aryloxycarbonyl and substituted aryloxycarbonyl, carboxy, acyloxy and substituted acyloxy, aroyloxy and substituted aroyloxy, carbamoyl and substituted carbamoyl, cyano, dialky- and diarylphosphonato, dialkyl-phosphinato and diarylphosphinato, and a polymer chain;

$R^7$ is selected from the group consisting of alkyl and substituted alkyl, alkenyl and substituted alkenyl, alkynyl and substituted alkynyl, saturated, unsaturated and aromatic carbocyclic ring, saturated, unsaturated aromatic heterocylic ring, alkylthio and substituted alkylthio group, and a polymer chain, such that $R^7$ forms free radical leaving group that can initiate free radical polymerization under the reaction conditions;

n is an integer greater than 1; $R^{7'}$ is an n-valent moiety derived from $R^7$ and Z' is an n valent moiety derived from a species selected from the group consisting alkyl and substituted alkyl, aryl and substituted aryl and a polymer chain where the connecting moieties are selected from the group consisting of aliphatic carbon, aromatic carbon, oxygen and sulfur; and wherein the substituents for the substituted moieties for $R^7$, $R^{7'}$, Z and Z' are selected from the group consisting of hydroxy, tertiary amino, halogen, cyano, epoxy, carboxylic acid, alkoxy, alkyl having 1–32 carbon atoms, aryl, alkenyl having 2–32 carbon atoms, alkynyl having from 2–32 carbon atoms, saturated carbocyclic rings having 3–14 carbon atoms, unsaturated carbocyclic rings having 4–14 carbon atoms, aromatic carbocyclic rings having 6–14 carbon atoms, saturated heterocyclic rings having 3–14 carbon atoms unsaturated heterocyclic rings having 4–14 carbon atoms and aromatic carbocyclic rings having 4–14 carbon atoms.

5. A thermosetting composition comprising said microgel of the process of claim 4.

6. A radiation-curable composition comprising said mircrogel of the process of claim 4.

7. A solvent-borne coating comprising said microgel of the process of claim 4.

8. A waterborne coating comprising said microgel of the process of claim 4.

9. An adhesive comprising said microgel of the process of claim 4.

10. A cosmetic comprising said microgel of the process of claim 4.

11. A plastic additive suitable for improving impact resistance comprising said microgel of the process of claim 4.

12. A pharmaceutical carrier comprising said microgel of the process of claim 4.

* * * * *

UNITED STATES PATENT AND TRADEMARK OFFICE
CERTIFICATE OF CORRECTION

PATENT NO. : 6,646,055 B2
DATED : November 11, 2003
INVENTOR(S) : Berge, Charles T. et al.

It is certified that error appears in the above-identified patent and that said Letters Patent is hereby corrected as shown below:

Column 15,
Line 18, "monoethylencically" should be -- monotheleneically --.
Line 19, "mononmers" should be -- monomers --.
Line 24, "monnomers" should be -- monomers --.
Line 33, "monethylenically" should be -- monoethylenically --.
Line 37, "hydroxyakyl" should be -- hydroxyalkyl --.
Line 39, "acrylonitrile,glycidyl" should be -- acrylonitrile, glycidyl --.

Column 16,
Line 11, "subsitituted" should be -- substituted --.
Line 21, "phosphonato" should be -- phosphinato --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,646,055 B2
APPLICATION NO. : 09/969706
DATED : November 11, 2003
INVENTOR(S) : Berge Charles T. et al.

It is certified that error appears in the above-identified patent and that said Letters Patent is hereby corrected as shown below:

On Title Page col. 1 should read,

(73) Assignees: E. I. du Pont de Nemours and Company, Wilmington, DE (US); Commonwealth Scientific and Industrial Research Organization, Victoria (AU).

Signed and Sealed this

Eighth Day of August, 2006

JON W. DUDAS
*Director of the United States Patent and Trademark Office*